Nov. 14, 1967   B. J. IVERSON   3,352,629
CAN COVER STERILIZER ON CAN CLOSING MACHINE
Filed Dec. 31, 1962   6 Sheets-Sheet 6

INVENTOR
BJARNE J. IVERSON

United States Patent Office 3,352,629
Patented Nov. 14, 1967

3,352,629
CAN COVER STERILIZER ON CAN
CLOSING MACHINE
Bjarne J. Iverson, Oak Park, Ill., assignor to Continental
Can Company, Inc., New York, N.Y., a corporation
of New York
Filed Dec. 31, 1962, Ser. No. 248,803
11 Claims. (Cl. 21—80)

This invention relates to a novel high speed can cover sterilizer for sterilizing can covers to make up with filled sterile cans, which, after closing will not require pasteurizing.

The invention is particularly adapted for use in cooperation with can closing machines of standard design which are to apply sterile covers to filled sterile cans: the fill being an acid type food product having a pH of below 4.5, such as, for instance, beer or citrus fruit juice. In canning such acid products "commercial sterilization" may be achieved at relatively low temperatures and in short periods of time due to the fact that the types of bacteria that adversely affect such products by being capable of growth therein are among the most readily killed by heat. On the other hand, products having a pH of 4.5 and above require either much higher temperatures or a very long time at a lower temperature to be rendered "commercially sterile."

For the sake of clarity, and to prevent misunderstanding, whenever the words "aseptic" or "sterile" are hereinafter used, what is meant is "commercially aseptic" or "commercially sterile." In the food industry "commercially sterile" means free of viable organisms capable of growth in the product under the conditions existing. It does not necessarily mean "absolutely sterile" in which no living micro-organisms are present.

In the usual practice of feeding can ends or covers to a closing machine, as described and illustrated in the patent to Glowen et al. No. 2,755,762 issued on July 24, 1956, there is no provision made to sterilize the covers before they are applied to the cans by the usual double seaming operation. In general canning practice, after the cans are filled and closed, they are placed in retorts where they are heat sterilized by means of steam. There is thus no need to presterilize the cans, product and covers when using this technique.

In recent years much interest has been shown in aseptic canning of many foods. Briefly, aseptic canning consists of filling a sterile product into pre-sterilized containers and closing the containers with sterile closures in a manner that prevents recontamination.

During aseptic canning of beer and other acid foods presterilization of the covers may also be accomplished at relatively low temperatures and in a short time. The following are minimum cover sterilization times and temperatures, not counting the time required to reach the temperature when beer is the product being canned:

Degrees F.: Seconds
160 _______________________________ 30.0
170 _______________________________ 5.0
180 _______________________________ 0.8
190 _______________________________ 0.05

Since the covers are normally fed into a can closing machine in stack form it has been proposed, in the past, to sterilize the covers in the stack as the stack is being fed into the closing machine by means of surrounding the stack with a heated liquid, heated gas, or steam. Steam is ideal for this purpose as it is available at all canning plants, is relatively inexpensive, and has a reliable temperature at normal atmospheric pressures of about 212 degrees F.

In order to achieve sterilization of the covers in the short time available: closing machines close cans at from 250 to 1000 per minute; it has been proposed in the past to separate the covers in the stack so that the heating fluid will contact the entire surface of the covers.

In the above mentioned Glowen et al. patent, the stack of covers being fed into the closing machine rests on a plurality of feed screws which separate the covers, one at a time, from the bottom of the stack and deliver the separated covers into the closing machine for application to filled cans. By axially lengthening the feed screws and providing them with many cover receiving threads of the square type, it is feasible to separate a plurality of covers from the bottom of the stack for sterilizing purposes. This has been done in the past and in the broad sense has worked out satisfactorily. It has been found that when using wet steam, at atmospheric pressure, as the sterilizing fluid, that for most acid products, satisfactory cover sterilization can be achieved when the feed screws are extended to hold in separated condition below the cover stack from about 7 to 40 covers. It is to be understood that with a given product requirement for sterilization, as the closing machine speed increases, the length of the feed screws will have to increase proportionally to obtain the necessary temperature-time sterilizing requirement. When less than 7 covers are separated for the purpose of sterilizing, the short time allowed for bringing the covers up to the necessary temperature to effect sterilization becomes critical. When using wet steam at atmospheric pressure it has been found that the covers need at least 1.0 to 2.0 seconds of direct exposure to the steam in order to bring them up to a temperature of 180 degrees F. or above, at which the micro-organisms that are detrimental to beer are killed in 0.8 second or less.

As the feed screws are made longer to hold more separated covers there between the time factor becomes less critical and the covers may be sterilized at lower temperatures at the longer times allowed. However, increasing the length of the feed screws beyond certain limits to increase the sterilizing time poses other problems. One problem is that the cover stack becomes so high that it is difficult for the machine operator to load the machine with fresh stacks of covers. Another problem is that the long feed screws are costly to replace when worn out. Feed screws with a capacity of from about 35 to 40 covers appear to be the maximum practical size using present loading procedures.

The present invention specifically provides effective solutions to two problems encountered during sterilization of covers as they are fed into the closing machine from the stack.

The first problem relates to providing an effective no-can no-end control when cover separating screws are used to facilitate the sterilizing process by effecting the exposure of the entire surface of the covers to the sterilizing fluid. In the referred to Glowen et al. patent, retractable lugs or fingers are located in the cover feed guide just above the cover feed screws. When the no-can no-end detector located adjacent the path of the incoming filled cans on the infeed conveyor to the closing machine detects a missing can in the procession of cans, it generates a signal which operates a no-can no-end device to project the lugs under the bottom cover in the stack to prevent its being delivered into the feed screws. Since the feed screws of Glowen et al. never contain more than one cover, the no-can no-end detecting device is necessarily located very close to the closing machine, which is desirable, and often necessary, if the conveyor between the filling and closing machine is short. If these screws were lengthened to contain many covers it will be apparent that the no-can no-end detecting device would have to be located further upstream with respect to the infeed conveyor to effect proper timing of the arrival of the space of the missing can and the space corresponding to the missing cover that is prevented from being delivered, at the can-cover make-up point of the closing machine. Using screws capable of holding from 7 to 40 covers the no-can no-end detecting device would have to be located much further upstream with respect to the infeed conveyor than can normally be tolerated. In accordance with the present invention, the non-can no-end detecting device is located closely adjacent the closing machine and its position is not affected by the length of the cover separating screws. Furthermore, the no-can no-end control device is of the type described in the Glowen et al. patent in which covers are periodically prevented from being delivered to the closing machine and are not delivered to and then rejected by the closing machine and thus wasted, as in some practices.

The second problem that is effectively solved by the present invention relates to the possibility of over exposure of the covers to the sterilizing fluid which can be undesirable. In the canning of beer and carbonated soft drinks in particular, it is common practice to coat the interior surfaces of the can components with a vinyl coating to protect the contents from exposure to the metal of the can and to protect the metal from corrosion by the product. Vinyl coatings are desirable in that they do not impart any off-flavor to the product, as well as for other reasons. One drawback with vinyl coatings is that they are subject to "blushing" or turning white when subjected to moisture at high temperatures. One of the most sensitive vinyl coatings "blushes" in approximately five seconds at 210 degrees F. when subjected to a steam atmosphere. Over-exposure could present a problem in the type of cover sterilizer of the invention wherein the feeding of caps to the closing machine is prevented when no cans are being fed into the closing machine. However, the invention provides for equal exposure of the covers to the direct effects of the main source of sterilizing fluid regardless of periodic interruptions in the feeding of filled containers to the closing machine.

In addition to providing solutions to the above two mentioned problems, the invention also provides a novel means by which the machine operator may empty the sterilizer of covers at the end of a run or preparatory to starting a new run.

In view of the above reasons for the necessity of the invention, it is an object of the invention to provide a novel can cover sterilizer controlled by a no-can no-end detecting device located closely adjacent a closing machine on a can in-feed conveyor, and, at the same time, allowing more than sufficient time for effectively sterilizing the covers in the can cover sterilizer.

Another object of the invention is to provide a novel container or can cover sterilizer, including a housing, a plurality of spaced apart axially extending rotatable screws in said housing for spacing apart covers conveyed by the screws, the housing including a manifold for distributing sterilizing fluid between the covers being conveyed in spaced relation by the rotatable spacing screws, a plurality of feeding screws for feeding sterile covers out of the housing, first control means for preventing covers from being fed out of the housing by the feed screws and second control means for preventing covers from being introduced to the plurality of rotatable spacing screws.

Another object of the invention is to provide a novel arrangement of the character immediately above stated wherein the first and second control means are operatively coupled together and actuated by a no-can no-end detecting device positioned adjacent a can in-feed conveyor.

Still another object of the invention is the provision of a novel can cover sterilizer of the character immediately above discussed wherein the residence or hold time of the covers being spaced and fed through the sterilizer is at least two seconds at temperatures of at least 170 degrees F. and, in addition, to provide a first rotatable conveyor adjacent an output end of the sterilizer for transporting covers therefrom along a predetermined arcuate path, a second rotatable conveyor adjacent the first rotatable conveyor for transporting the covers along a second predetermined arcuate path toward a make-up point on the can in-feed conveyor, and a fluid distributing manifold located along portions of both of the predetermined arcuate paths for directing sterilizing fluid toward the covers being transported by the rotatable conveyors whereby the covers are completely sterilized between the upper end of the housing and the make-up point of the can in-feed conveyor.

Another object of this invention is to provide a novel method of conveying filled cans to a make-up point and sterilizing and moving a plurality of can covers to the make-up point including the steps of moving a plurality of filled cans along a predetermined path to a make-up point at the end of the path, detecting the condition of filling the cans during the movement thereof, simultaneously moving and sterilizing a plurality of can ends at a time-temperature condition of at least approximately two seconds at a temperature of at least 170 degrees F., and thereafter moving the can covers to the make-up point under the influence of a sterilizing fluid to assure and maintain complete sterilization of a plurality of covers.

Another object of this invention is the provision of a novel method including the steps immediately above mentioned, and momentarily preventing an additional cover from being sterilized and a sterilized cover from momentarily moving toward the make-up point.

With the above, and other objects in view that will hereinafter appear, the nature of the invention will be more clearly understood by reference to the following detailed description, the appended claims and the several views illustrated in the accompanying drawings.

Figure 1:
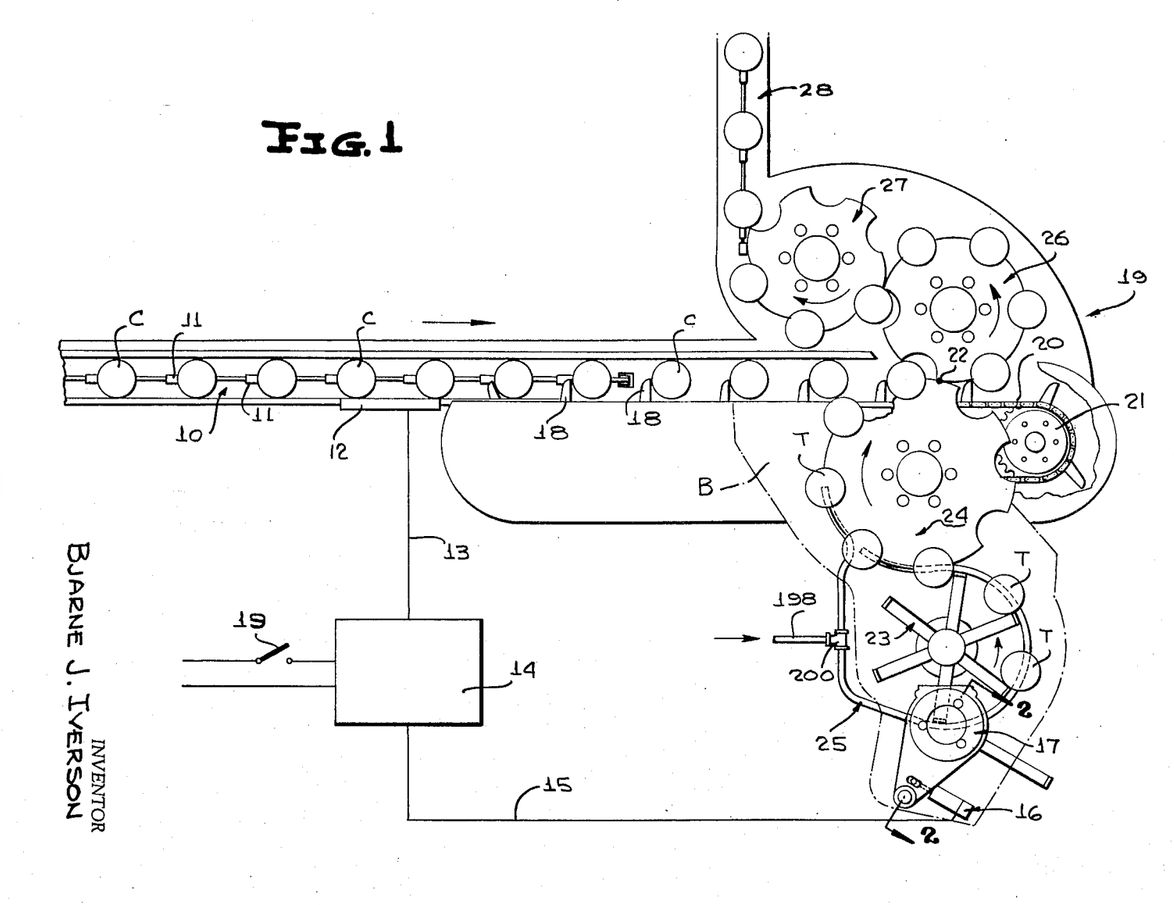
FIGURE 1 is a diagrammatic plan view of a can closing machine modified in accordance with this invention, and illustrates a can in-feed conveyor, a no-can no-end detector located adjacent the in-feed conveyor and operatively connected to a can cover sterilizer, a star wheel cover feed turret adjacent the can cover sterilizer, a distributing manifold positioned beneath the star wheel cover feed turret, a can feed turret, a seaming turret and a discharge turret.

In the example embodiment of the invention herein disclosed, a plurality of cans C are fed into a can closing machine, generally indicated at 19, in processional order, and in equidistantly spaced relation, over a straight line feedway 10, as shown in FIGURE 1, by a plurality of feed means generally designated 11. The plurality of cans C are sterile and are filled with a sterile product, such as beer. However, any other suitable acid type product which would not require pasteurizing after the sterile cans are closed may be packaged therein.

The feed means 11 are preferably a plurality of feed dogs on a chain conveyor which is driven by a suitable mechanism (not shown) in the direction of the arrow passed a no-can no-end detector 12. The no-can no-end detector 12 may be of the type disclosed in the priorly discussed U.S. Letters Patent 2,755,762 issued to Lawrence F. Glowen et al. on July 24, 1956. The main purpose of the non-can no-end detector 12 is to prevent a cover from being delivered for closing a can whenever a missing can is detected on the straight line feedway 10. A no-can signal generated by the non-can no-end detector 12 is communicated over the line 13 to a non-can no-end control mechanism 14 and thence over a line 15 to a solenoid operated no-can no-end actuating device 16 of the cover sterilizer 17 in a manner to be described more fully hereafter. A switch 19 in the power circuit of the no-can no-end control mechanism 14 deactivates this control mechanism and allows the cover sterilizer 17 to deliver covers with no cans being fed for a purpose to be hereafter described.

After the plurality of cans C pass the position of the no-can no-end detector 12 they are transported by a plurality of laterally projecting feed dogs 18 of an endless chain conveyor 20 entrained about a drive sprocket 21 toward a make-up point 22. A plurality of sterile covers T are synchronously fed out of the cover sterilizer 17 and transported by a rotating star wheel cover feed turret 23 to a can feed turret 24. A tubular distributing manifold 25 directs sterilizing fluid such as steam across the under surfaces of the covers T while the covers are being conveyed by the star wheel cover feed turret 23 and the can feed turret 24. The can feed turret 24 deposits a cover T onto each of the plurality of cans C at the make-up point 22 where the covers T and the underlying plurality of cans C comes into alignment.

The cans and covers are then transported by a rotary seaming turret 26 which double seam secures the plurality of covers T upon the cans C in the usual manner. The cans are then delivered by the seaming turret 26 to a discharge turret 27 wherafter the cans are fed out of the closing machine 19 by a take-off conveyor 28.

The cover sterilizer 17 of this invention will be best understood by referring to FIGURES 2 through 6 of the drawings to which attention is now directed.

Figure 2:
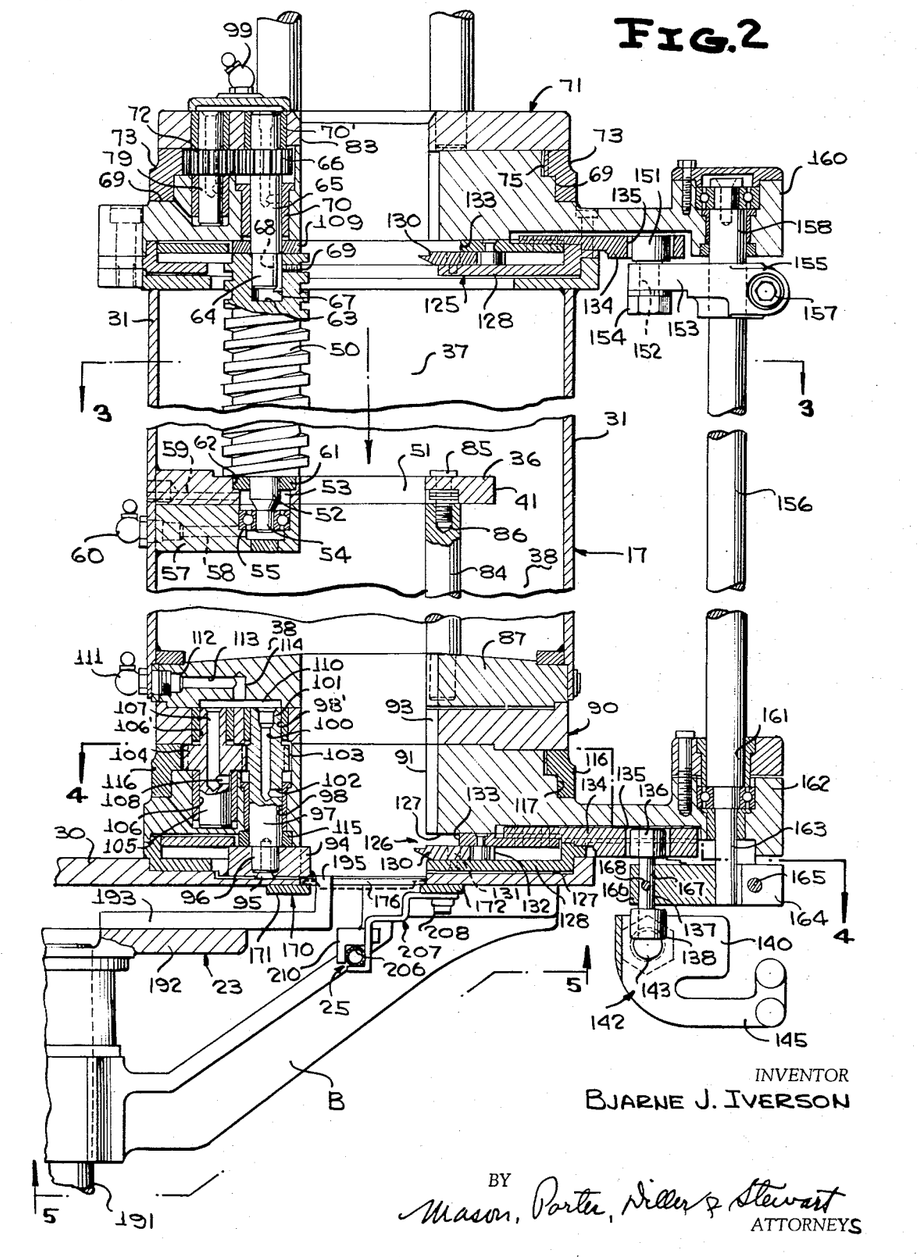
FIGURE 2 is an enlarged fragmentary vertical sectional view of the cover sterilizer of FIGURE 1 taken along line 2—2, and shows one of a plurality of rotatable cover spacing screws, one of a plurality of rotatable feed screws, and a first and second control mechanism operatively associated by a crank arm for preventing a cover from entering between the plurality of rotating spacing screws and also preventing a cover from being transferred to a guide plate of the star wheel cover feed turret.
Figure 5:
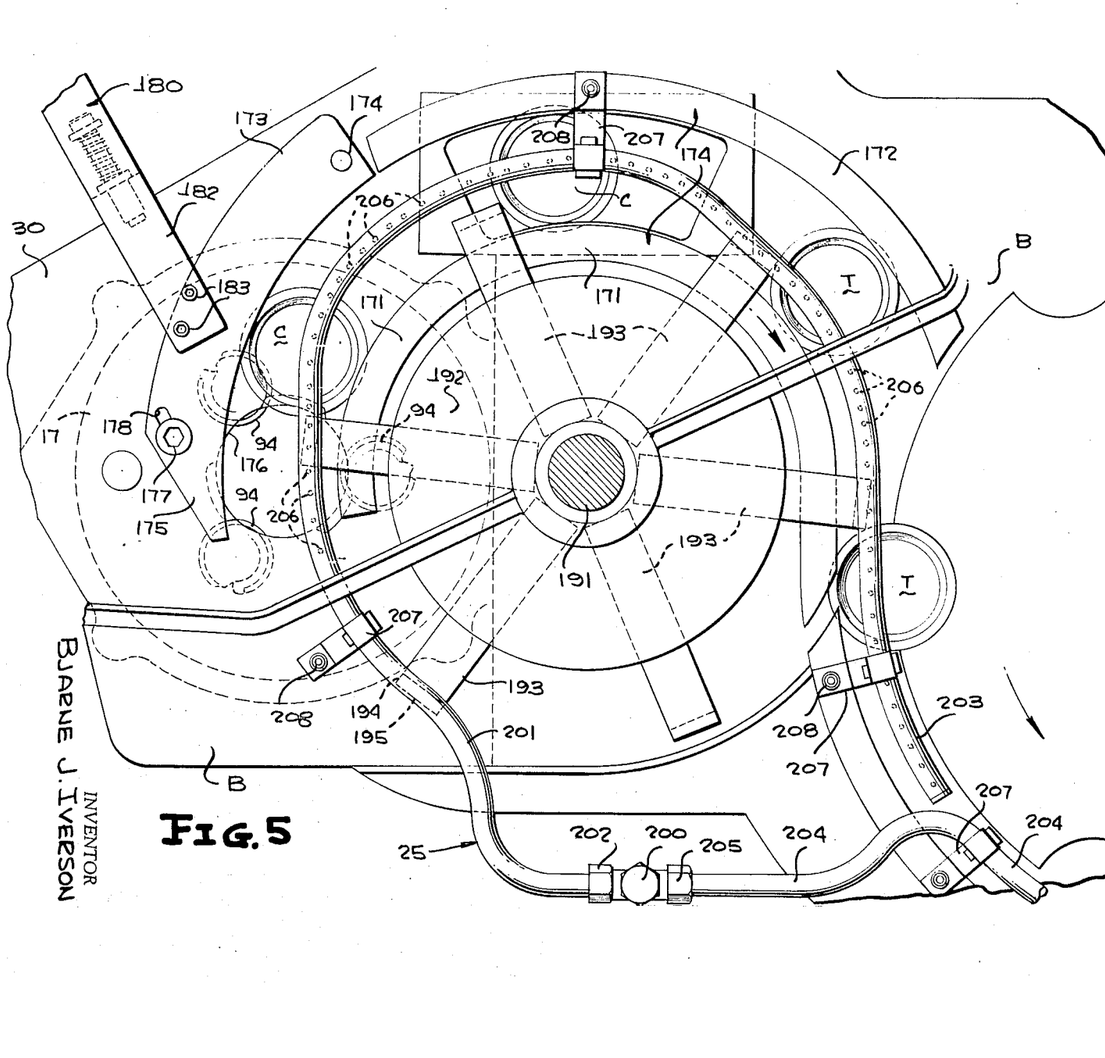
FIGURE 5 is a fragmentary bottom view of the cover sterilizer and the star wheel cover feed turret taken along line 5—5 of FIGURE 2, and shows a tubular fluid distribution manifold having a plurality of orifices for directing sterilizing fluid upwardly against the bottoms of covers conveyed by the star wheel cover feed turret along a guide track to the can feed turret.

The cover sterilizer 17 is suitably mounted on a cover plate 30 of a machine base B in overlying relationship to the star wheel cover feed turret 23, as is best illustrated in FIGURES 2 and 5 of the drawings.

Figures 3, 8:
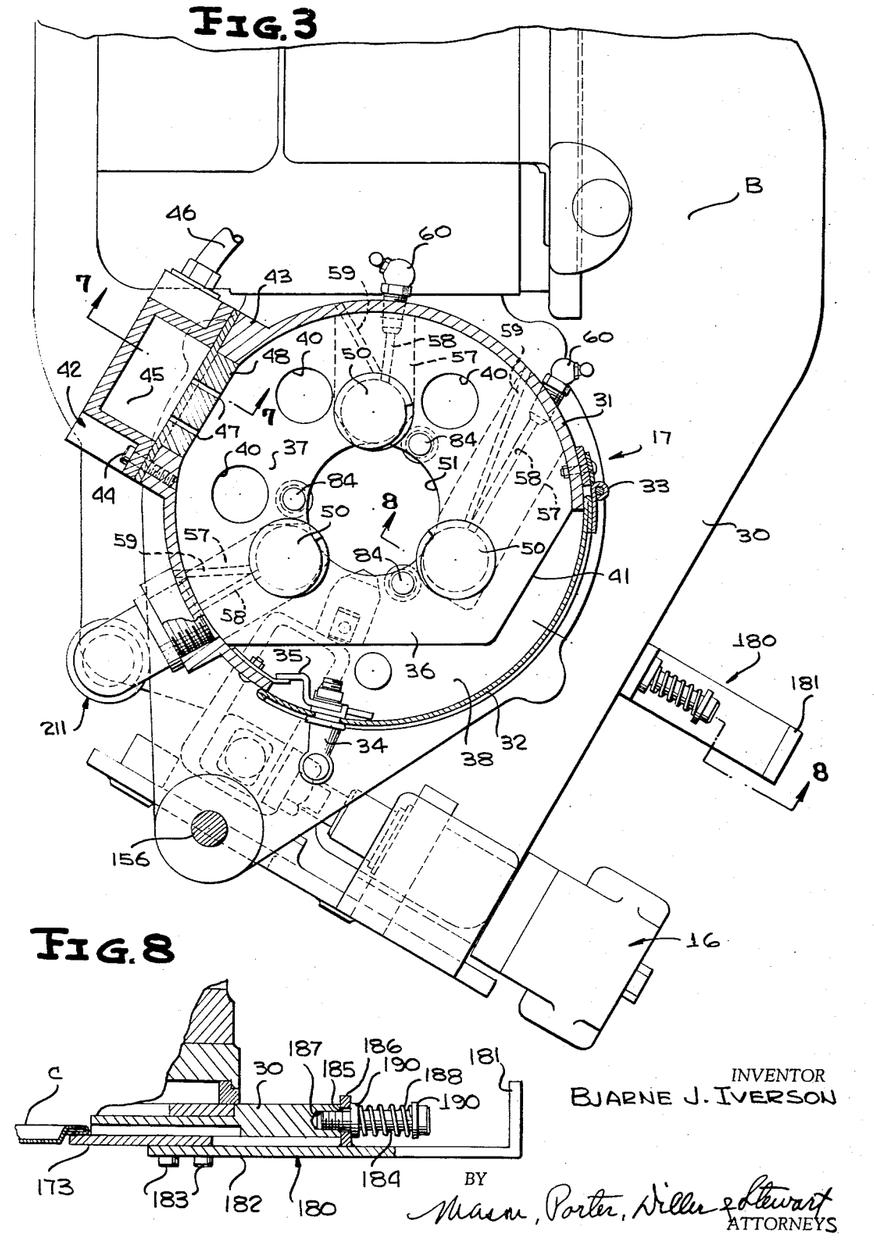
FIGURE 3 is a transverse sectional view of the cover sterilizer taken along line 3—3 of FIGURE 2, and illustrates a cover sterilizer housing, a fluid distributing manifold in communication with the interior of the housing, a partition separating the housing into an upper chamber and a lower chamber, a plurality of drain holes in the partition, the plurality of rotatable spacing screws circumferentially positioned about a central opening in the partition, a cover reject arm and a solenoid operated no-can no-end cylinder.
FIGURE 8 is a jump sectional view taken along line 8—8 of FIGURE 3, and shows the cover rejecting arm in position prior to being drawn outwardly against the bias of a compression spring for running out a plurality of covers in the cover sterilizer housing.

The cover sterilizer 17 comprises a generally cylindrical upstanding housing 31 having an open portion thereof closed by a door 32 secured to the housing 31 by a hinge 33 (see FIGURE 3). A latch mechanism 5 secured to a rotatable handle 34 journalled in the door 32 permits the door 32 to be securely closed when the cover sterilizer 17 is in operation. However, the door 32 may be opened to gain access into the interior of the housing 31 for purposes of maintenance.

A partition plate 36 divides the housing 31 into an upper chamber 37 and a lower chamber 38. A plurality of drain holes 40 are formed in the partition plate 36, and a free edge portion 41 of the partition plate 36 is spaced from the door 32 of the housing 31. The plurality of drain holes 40 and the space between the free edge 41 of the partition plate 36 and the door 32 allows sterilizing fluid, such as steam which is introduced into the upper chamber 37 by means of a fluid distributing manifold 42 to travel downwardly into the lower chamber 38 of the cover sterilizer 17.

The fluid distributing manifold 42 is secured to an upper outwardly offset portion 43 of the sterilizer housing 31 by a plurality of threaded bolts 44. The distributing manifold 42 includes a substantially rectangular chamber 45 into which sterilizing fluid is directed by means of a conduit 46 in communication with a suitable source of sterilizing fluid (not shown). The chamber 45 is substantially as long as the axial length of the upper chamber 37 of the sterilizer housing 31. A pair of parallel elongated fluid distributing slots or orifices 47 in an inwardly directed portion 48 of the fluid distribution manifold 42 direct the sterilizing fluid from the chamber 45 into the upper chamber 37 toward the axis of the sterilizer housing 31.

Three identical rotatable spacing and conveying screws 50 are located in the upper chamber 37 of the cover sterilizer 17. The plurality of rotatable spacing screws 50 are arranged in parallel relation to each other and are circumferentially spaced about the periphery of a guide opening 51 in the partitioning plate 36.

Each one of the plurality of rotatable spacing screws 50 has an end portion 52 depending downwardly through a circular bore or aperture 53 in the partitioning plate 36. Each of the depending extensions 52 of the plurality of rotatable spacing screws 50 terminates in a shaft 54 received in an anti-friction bearing 55. Each anti-friction bearing 55 is housed in a bore 53 of a bearing block 57. Each of the bearing blocks 57 (see FIGURE 2) underlies the partitioning plate 36 and is suitably secured to the housing 31 of the cover sterilizer 17. Each of the bearing blocks 57 is provided with a passage 58 establishing communication between the circular bore 53 and a grease fitting 60 which is threadably attached to each of the bearing blocks 57. Thus, a lubricant may be introduced into the circular bore 53 of each of the bearing blocks 57. An annular grease seal 61 surrounds the depending extension 52 of each of the rotatable spacing screws 50 and is seated in a counter bore 62 of the circular aperture 53 in the partitioning plate 36. The grease seal 61 prevents contamination of the covers which will otherwise result from the lubricant escaping from within the aperture 53. A grease outlet bore 59 is provided in communication with each aperture 53, through which the old grease is forced out when fresh grease is supplied through the grease fitting 60.

An upper end of each of the plurality of rotatable spacing screws 50 is axially bored at 63 and receives therein an end portion 64 of a shouldered shaft 65 having a gear 66 at an upper end thereof. A drive connection between each of the plurality of rotatable spacing screws 50 and the end portions 54 of the shafts 65 is formed by an elongated key 67 which fits into an elongated groove 68 in the end portion 64 of each of the shafts 65. The key 67 is recessed in a groove in the bore 63 and is backed up by a set screw 29'. The shaft 65 of FIGURE 2 is free to rotate in bushings 70 and 70' mounted in a head plate 71 of the housing 31. An idler gear 72 integral with a shouldered stub shaft 79 is in mesh with the gear 66 and the stub shaft 79 is rotatably journaled in the head plate 71 of the housing 31 in a manner clearly shown in FIGURE 2 of the drawings. A ring gear 73 is mounted in a peripheral groove 69 of the head plate 71, and has a plurality of inwardly directed teeth 75 intermeshed with each of the gears 72.

Figures 6, 7:
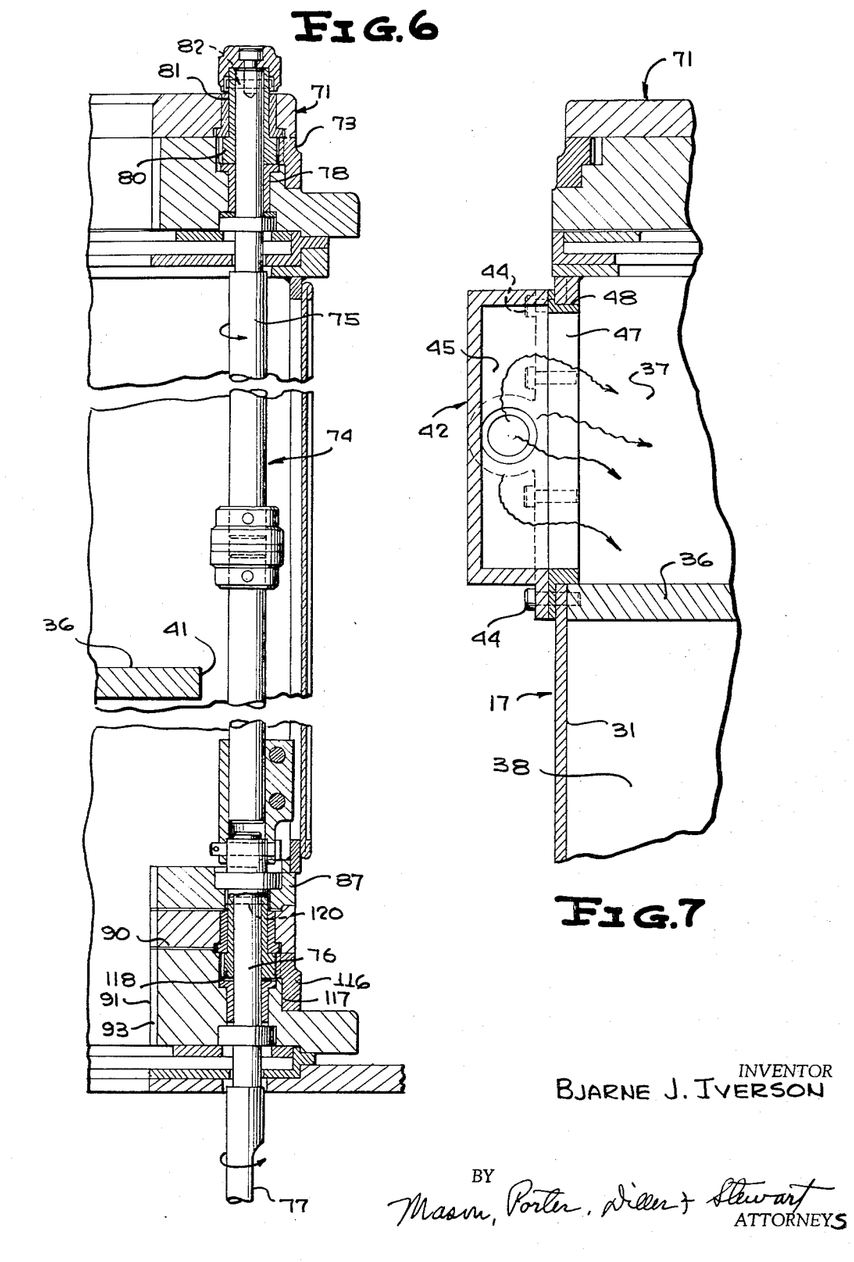
FIGURE 6 is a fragmentary vertical sectional view taken along line 6—6 of FIGURE 4, and illustrates the drive shaft connection for rotating the plurality of feed screws and spacing screws.
FIGURE 7 is a fragmentary vertical sectional view taken along line 7—7 of FIGURE 3, and shows a fluid distribution manifold in communication with the upper chamber of the cover sterilizer housing for distributing sterilizing fluid between the covers spaced by the plurality of rotatable spacing screws.

The drive connection for the ring gear 73 is best illustrated in FIGURE 6 of the drawings. A drive shaft 74 includes an upper portion 75 and a lower portion 76. The lower portion 76 of the drive shaft 74 is faced off at 77. The faced-off portion 77 of the drive shaft 74 is rotatably connected (not shown) in synchronous driven relationship with the drive mechanism (not shown) of the can closing machine 19. The upper portion 75 of the drive shaft 74 is rotatably received in a bushing 78 mounted in the head plate 71 of the housing 31. A pinion gear 80 having a sleeve 81 is slidably received on the end portion 75 of the drive shaft 74 and secured thereto by a transverse pin 82. The pinion gear 80 is intermeshed with the ring gear 73 as clearly shown in FIGURE 6. Thus, as the drive shaft 74 is rotated, the pinion gear 80 rotates imparting movement to the ring gear 73. As the ring gear 73 is rotated by the pinion gear 80, the gear 72 (see FIGURE 2) in mesh therewith is rotated. Rotation of the gear 72 causes rotation of the gear 66 and the shaft 65 thereof. As a shaft 65 rotates, rotary motion is imparted to the spacing screw 50 of FIGURE 2.

While the drive connection for only the spacing screw 50 of FIGURE 2 has been described, it is to be understood that the remaining spacing screws 50 are driven in an identical manner. Thus, as a plurality of covers are fed downwardly through an axial feed opening 83 in the head plate 71 of the housing 31, the peripheries of the covers are engaged by the rotating spacing screws 50 and are conveyed downwardly in spaced relationship in the direction of the broken arrow in FIGURE 2. The spacing screws 50 illustrated are long enough to hold approximately ten covers spaced apart a distance of three sixteenths of an inch between adjacent covers. This spacing between the covers permits sterilizing fluid such as steam entering the upper chamber 37 from the distributing manifold 42 and the pair of elongated orifices 47 to surround each of the spaced covers. The hold time or residence of each cover being conveyed by the spacing screws 50 should be at least two seconds at a temperature of 170 degrees F. or more if the covers are to be sufficiently sterilized for the aseptic canning of beer.

As the covers leave the plurality of rotating spacing screws 50, they drop through the central aperture 51 in the partitioning plate 36 downwardly into the lower chamber 38, as is best illustrated in FIGURE 2. The covers are guided in their downward descent through the lower chamber 38 by three circumferentially spaced guide rods 84 (see FIGURE 3). Each of the three guide rods 84 is secured at an upper end portion thereof to the partitioning plate 36 adjacent the opening 51 thereof by a threaded bolt 85 received in a threaded bore 86 of the guide rod 84. The lower end portion of the guide rod 84 of FIGURE 2, as well as the other two guide rods 84 of FIGURE 3, is threadedly secured to an inwardly directed peripheral flange 87 secured to the housing 31 of the cover sterilizer 17. The inwardly directed peripheral flange 87 overlies and is secured (by means not shown) to a base plate 90 of the housing 17.

Figure 4:
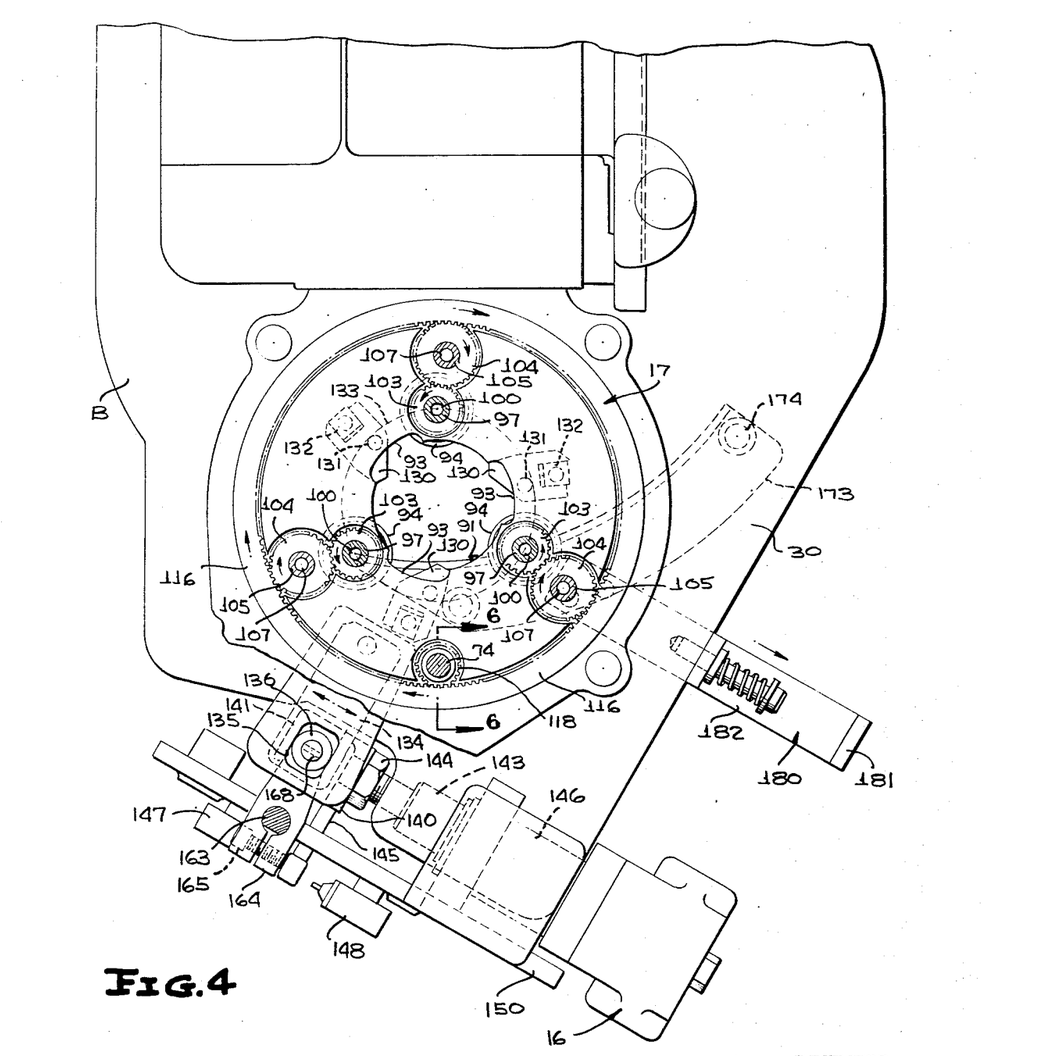
FIGURE 4 is a transverse jump sectional view of the cover sterilizer taken along line 4—4 of FIGURE 2 and shows a plurality of rotatable feed screws, a gear meshed between each of the feed screws and a ring gear, a drive gear meshed with the ring gear and three shiftable fingers axially directed toward an exit-opening in a bottom portion of the cover sterilizer housing.

The base plate 90 has a central circular opening 91 in axial alignment with the circular aperture 51 of the partitioning plate 36 and the cover feed opening 83 in the head plate 71. As is best illustrated in FIGURE 4 of the drawings, the central opening 91 in the base plate 90 is peripherally interrupted by three recess portions 93, which perform a function to be hereafter described.

Three identical rotatable feed screws 94 are circumferentially spaced about the central opening 91 (see FIGURE 4) and each of the rotatable feed screws 94 is journalled in the base plate 90 of the housing 31 in a manner illustrated in FIGURE 2. The rotatable feed screw 94 of FIGURE 2 is secured by a screw 95 to an end portion 96 of a shouldered rotatable shaft 97. The shaft 97 is rotatably mounted in bushed bores 98 and 98' of the base plate 90 and includes an axial passage 100 opening upwardly through an end portion 101 of the shaft 97. A radial bore 102 places the axial passage 100 of the shaft 97 in fluid communication with the bore 98 in the base plate 90. An integral feed screw gear 103 of the shaft 97 is intermeshed with a gear 104 on a shaft 105 rotatably received in bushed bores 106 and 106' of the base plate 90. The shaft 105 is provided with an axial passage 107 and a radial bore 108 opening into the bore 106 of the base plate 90.

The axial passages 100 and 107 are in communication with a radial groove 110 in the inwardly directed peripheral flange 87 overlying the base plate 90. A grease fitting 111 is threaded into a portion 112 of a radial passage 113 in the peripheral flange 87, and is in fluid communication with the radial groove 110 by a vertical bore 114. Thus, lubricating fluid may be introduced into the bores 98 and 106 by means of the grease fitting 111, the radial passage 113, the vertical bore 114, the radial groove 110, and the respective axial passages 100 and 107 and the radial bores 102 and 108 in the shafts 97 and 105. Grease seal 115 is provided around the lower end of shaft 97 to maintain a grease-proof connection to prevent contamination of the covers.

Grease is provided to the gears 66 and 72 and the shafts 65 and 79 in a similar manner by means of a grease fitting 99. A grease seal 109 similar to the grease seal 115 is provided around the shaft end portion 64.

Each of the gears 104 meshes with a ring gear 116 (see FIGURE 4) rotatably guided in a peripheral slot 117 in the base plate 90. As the ring gear 116 rotates, rotation is imparted to each of the gears 104 and the gears 103 causing rotation of the three feed screws 94. The rotation of the feed screws 94 feeds the sterile covers outwardly from the central cover opening 91 of the base plate 90 for subsequent transport by the star wheel cover feed turret 23 in a manner to be hereafter described.

The ring gear 116 is driven by the drive shaft 74 of FIGURE 6 in a manner substantially identical to that discussed in connection with the ring gear 73. A pinion gear 118 in mesh with the ring gear 116 is slidably received on the lower portion 76 of the drive shaft 74 and secured thereto by a transverse pin 120. As the faced-off portion 77 of the drive shaft 74 is rotated in a manner heretofore discussed, the pinion gear 118 secured to the lower end portion 76 thereof is rotated. Rotation of the pinion gear 118 causes rotation of the ring gear 116. The ring gear 116 drives each of the gears 104 which, in turn, drives a respective one of the gears 103 causing rotation of the feed screws 94 as is clearly illustrated in FIGURE 4 of the drawings.

It was previously mentioned in connection with the FIGURE 1 disclosure that the absence of a can on the straight line feedway 10 is detectable by the no-can no-end detector 12. By means of the no-can no-end detector 12 which may be of the type disclosed in the Lawrence F. Glowen et al. patent hereinbefore referred to, the no-can no-end actuating device 16 is operated. The actuating device 16 is operatively connected to a first control mechanism 125 in the head plate 71 of the housing 31 to prevent covers from entering between the plurality of rotatable spacing screws 50 and is also connected to a second control mechanism 126 in the base plate 90 of the housing 31 to prevent covers from being fed into the feed screws 94 and out of the cover sterilizer 17. The first and second control mechanisms 125 and 126 respectively, are identical and a description of the second control mechanism 126 is deemed adequate for a complete understanding of both mechanisms.

The second control mechanism 126 is housed in an annular seat 127 of the base plate 90. An annular base portion 128 is seated within the annular seat 127 and secured to the base plate 90 in a conventional manner. Three cover stack supporting fingers 130 are each identically pivotally secured to the annular base portion 128 by a respective pivot pin 131, as is best illustrated in FIGURE 4 of the drawings. Each of the supporting fingers 130 is circumferentially spaced about the cover opening 91 in the base plate 90 and adjacent a respective recess portion 93 thereof. A rear portion of each of the supporting fingers 130 is forked to receive therein a depending block 132 secured to an oscillatable annular ring 133. Fixedly secured to the oscillatable ring 133 is a radial arm projection 134 which is longitudinally slotted as at 135 to receive an actuator roller 136 in the manner clearly illustrated in FIGURE 4. The roller 136 is rotatably journalled on a depending shaft 137 to which a second actuator roller 138 is rotatably secured. The actuator roller 138 is located between a first leg 140 and a second leg 141 of a substantially U-shaped member 142. The first leg 140 of the U-shaped member 142 is threadably attached to a plunger 143 of the solenoid operated no-can no-end actuating device 16. A lock nut 144 secures the U-shaped member 142 on the plunger 143. The U-shaped member 142 includes a switch arm 145 integral with the first leg 140 for a purpose to be hereafter described.

The plunger 143 is telescopically received in a cylinder 146 of the no-can no-end actuating device 16. The cylinder 146 is preferably an air cylinder which is controlled by a solenoid valve (not shown) whereby the plunger 143 may be moved inwardly and outwardly with respect to the air cylinder 146 in a conventional manner. As the plunger 143 moves inwardly with respect to the cylinder 146 in response to an indication by the no-can no-end detector 12 that a can is absent on the straight line feedway 10 the actuator roller 138 is moved from left to right as viewed in FIGURE 4 by the second leg 141 of the U-shaped member 142 secured to the plunger 143. This movement of the actuator roller 138 is imparted by the shaft 137 to the actuator roller 136 to cause oscillation of the annular ring 133 in a counterclockwise direction. The movement of the annular ring 133 in a counterclockwise direction causes the support fingers 130 to pivot outwardly beyond the recess portions 93 as is best illustrated in FIGURE 4. With the support fingers 130 in the FIGURE 4 position, the covers stacked in the cover opening 91 of the base plate 90 are supported by the fingers 130 and prevented from entering between the feed screws 94. Thus, a cover cannot be fed out of the housing 31 when the supporting fingers 130 are in the position illustrated in FIGURE 4. A first microswitch 147 and a second microswitch 148 secured to a depending extension 150 of the cover plate 30 (see FIGURE 4) cooperate with the switching arm 145 to retract the plurality of supporting fingers 130 as the normal procession of cans C on the feedway 10 begins, in a manner disclosed in the Lawrence F. Glowen et al. patent hereinbefore referred to.

As was heretofore mentioned, the first control mechanism 125 is identical to the second control mechanism 126 and includes an annular base portion 128, a plurality of supporting fingers 130, an oscillatable ring 133; a radial arm 134 secured to the oscillatable ring 133, and an elongated opening 135 in the arm 134. An actuator roller 151 is located in the elongated opening 135 and includes a depending shaft 152 secured to a rocking arm 153 by a nut 154.

The rocking arm 153 has a split end portion 155 secured to a vertical crank arm 156 by a threaded bolt 157. An upper end portion 158 of the crank arm 156 is rotatably journalled in a projecting portion 160 of the head plate 71, in a manner clearly illustrated in FIGURE 2. A lower end portion 161 of the crank arm 156 is similarly journalled in a projecting portion 162 of the base plate 90. A terminal portion 163 of the lower crank arm portion 161 is clampingly received in a split collar or sleeve 164 and non-rotatably retained therein by a threaded bolt 165 as best illustrated in FIGURE 4 of the drawings. An end portion 166 of the split sleeve 164 is provided with a vertical bore 167 receiving the shaft 137. A transverse pin 168 secures the split sleeve 164 to the shaft 137.

At the same time the plunger 143 is drawn inwardly with respect to the cylinder 146 to actuate the second control mechanism 126 and thereby prevent covers from being fed from the housing 31 clockwise rotation is imparted to the crank arm 156 by the split sleeve 164 connected between the shaft 137 and the termial portion 163 of the crank arm 156. As the crank arm 156 is rotated in a clockwise direction, the rocking arm 153 secured thereto is similarly moved clockwise. This clockwise movement of the rocking arm 153 oscillates the ring 133 of the first control mechanism 125 in a counterclockwise direction whereby the support fingers 130 thereof are projected outwardly to prevent covers from entering between the three rotating spacing screws 50. With this simultaneous actuation of the first control mechanism 125 and the second control mechanism 126, the first control mechanism 125 maintains the height of the stack of covers in the lower chamber 38 at a desired level and thus prevents the jamming up of covers stacked between the plurality of rotating feed screws 94 and the partitioning plate 36.

When the supporting fingers 130 of the first control mechanism 125 and the second control mechanism 126 are in their retracted position, covers are singularly fed by the rotatable feed screws 94 to a guide track 170 underlying and secured to the cover plate 30. The guide track 170 is best illustrated in FIGURE 5 of the drawings and includes an inner arcuate track 171 and an outer arcuate track 172. The tracks 171 and 172 are spaced apart a distance slightly less than the diameter of the covers T being supported and guided thereby. A section 173 of the outer arcuate track 172 is pivotally secured to the underside of the cover plate 30 by a pivot pin 174. An end portion 175 of the pivoted track section 173 underlies a circular aperture 176 in the cover plate 30. A bolt 177 passed through an elongated slot 178 in the pivoting track section 173 is secured to the underside of the guide plate 30. The bolt 177 and the elongated slot 178 cooperate in a well known manner to guide the pivoting movement of the track section 173 about the pivot pin 174.

A retracting device 180 includes a finger gripping portion 181 and an elongated arm 182 secured to the pivoting track section 173 by a pair of screws 183. As is best illustrated in FIGURE 8 of the drawings, a bolt 184 is slidably received through an aperture 185 in an upwardly projecting member 186 secured to the elongated arm 182 of the retracting mechanism 180. The bolt 184 is threaded into a radial threaded portion 187 in the cover plate 30. A compression spring 188 is captively retained on the bolt 184 by a pair of washers 190 in FIGURE 8. The bias of the compression spring 188 maintains the pivotal track section 173 in proper spaced relation to the inner arcuate track 171 during the operation of the cover sterilizer 17. However, should it become necessary or desirable to reject the covers from the cover sterilizer 17, the switch 19 of FIGURE 1 is turned to deactivate the no-can no-end control mechanism 14 while the arm 182 of the retracting mechanism 180 is manually or automatically held in a retracted position. Thus, the cover sterilizer 17 may be emptied while there are no cans being transported on the infeed conveyor 10 by merely deactivating the no-can no-end control mechanism 14 and retracting the arm 182 of the reactor mechanism 180.

Covers which are deposited on the guide track 170 are transported in a counterclockwise direction (clockwise direction looking at FIGURE 5) by the star wheel cover feed turret 23. The star wheel cover feed turret 23 includes vertical shaft 191 rotatably journalled in the base B and driven by a suitable mechanism (not shown) in synchronism with the cover sterilizer 17. The vertical shaft 191 of the star wheel cover feed turret 23 has fixedly attached thereto a circular upper plate 192 to which is secured a plurality of circumferentially spaced outwardly directed arms 193. Each of the arms 193 underlies the cover plate 30 and has an upwardly directed finger 195 which extends beyond the uppermost portion of the guide track 170, as is best illustrated in FIGURE 2 of the drawings. As the rotatable feed screws 94 deposit a cover through the circular aperture 176 in the cover plate 30 upon and between the inner annular track 171 and the pivotable track section 175, an edge portion 194 of a finger 195 contacts a peripheral edge of the cover and arcuately transports the same along the guide track 170 until the cover is transferred to the can feed turret 24.

The minimum safe hold time or residence of the covers T being fed and spaced by the rotating spacing screws 50 is approximately two seconds at a cover temperature of 180 degrees F. Under the above time-temperature conditions, there is just barely sufficient time to effectively sterilize the covers in the cover sterilizer 17 and if the can seaming turret 26 were to be run at a higher speed or if the supply of steam was not quite adequate, the covers T might very well not be adequately sterilized.

It is to be understood that in the herein disclosed embodiment in which the spacing screws hold 10 covers, the closing machine must not exceed 300 cans per minute if the covers are to remain in the spacing screws for the minimum safe two seconds. Doubling the length of the screws will allow speeds of 600 cans per minute and tripling the length will allow speeds of 900 cans per minute. If screws able to hold 30 covers are used and the machine is operated at speeds up to 300 cans per minute giving a residence time of the covers in the screws of 6 seconds or more the temperature of the covers can be as low as 170 degrees F. A cover temperature of 170 degrees F. is about the minimum practical temperature to use since below 170 degrees F. the time required for sterilization goes up rapidly. At 160 degrees F. the time required is about 30 seconds which is too long for the apparatus of the invention.

To insure that sterile conditions are maintained in the closing machine at least over the path of travel of the covers as they are conveyed to the make-up point and each of the covers T receives two seconds of sterilization, the tubular distribution manifold 25 is positioned beneath the star wheel cover feed turret 23 and also beneath a portion of the can feed turret 24. The tubular distribution manifold 25 comprises a conduit 198 (see FIGURE 1) in communication with a suitable source of sterilizing fluid, such as steam. The conduit 198 is attached to a T-coupling 200. A first curved conduit 201 is secured to an arm 202 of the T-coupling 200 and bends along the path of travel of the covers T from the central aperture 176 in the guide plate 30 and terminates in an end portion 203 underlying an arcuate portion of the can feed turret 24. A second curved conduit 204 is similarly secured to another arm 205 of the T-coupling 200 and bends along a portion of the path of travel of the covers T established by the can feed turret 24. The first curved conduit 201 and the second curved conduit 204 each include a plurality of upwardly directed orifices 206 for directing sterilizing fluid against the under surfaces of the covers T and upwardly through the central aperture 176 toward the three rotating feed screws 94. In this manner the plurality of covers T are subjected to sterilizing fluid from the time they enter the cover sterilizer 17 until just prior to reaching the make-up point 22 of FIGURE 1. The orifices 206 directed into the aperture 176 may be very small so as not to direct sufficient sterilizing fluid against a cover being supported by the feed screws 94 when no cans are being supplied to cause blushing of the protective coating thereon. As an alternative, the orifices 206 directly under the central aperture 176 may be omitted.

A plurality of identical supporting brackets 207, one of which is best illustrated in FIGURE 2 of the drawings, supports the distribution manifold 25 along the path of travel of the plurality of covers T from the cover sterilizer 17 toward the make-up point 22. Each of the plurality of support brackets 207 is secured to the cover plate 30 by a threaded bolt 208. An L-shaped bracket 210 is threaded into each of the supporting brackets 207 in a manner clearly illustrated in FIGURE 2 to clamp the tubular distributing manifold 25 in position.

It is to be understood that by making the spacing screws 50 longer than just described so that a more than minimum period of residence is permitted the covers in the spacing screws, the only function of the tubular distribution manifold 25 and orifices 206 will be to maintain the path of travel of the covers to the make-up point in sterile condition.

It is to be further understood that if there is a sudden stop in the supply of cans being fed into the closing machine the fingers 130 will arrest the supply of covers to the spacing screws 50 and the screws will continue to operate to deliver the covers therein onto the stack of covers in the lower chamber 38 in the usual manner. There will thus be no over-exposure of any of the covers to the direct heat of the sterilizing fluid jetting from the slots 47. Sterilizing fluid will wend into the lower chamber 38 through the drains 40 and around the free edge 41 to keep the stack of covers in the lower chamber hot but not to the extent to cause blushing of the protective coating thereon. Used sterilizing fluid or steam condensate is disposed of by means of an elbow and pipe drain indicated at 211 in FIGURE 3 which connects into the lower chamber 38 of the housing 31.

To start operation of the cover sterilizer, a stack of covers is formed in the lower chamber by running the closing machine with no cans being fed and with the switch 19 open. A rod is inserted through the door 32 to catch the covers fed out of the spacing screws until a stack of the proper height has been formed above the rod. The rod is then removed, the door closed, and the steam or other sterilizing fluid is turned on. Upon taking out of the rod, or preferably slightly before, the retracting device 180 is actuated by means of the finger grip portion 181. All of the covers in the sterilizer will thus be run out of the machine and the covers taking their place will be properly sterilized and ready to be applied to cans.

In setting the cover stack height in the lower chamber by means of the rod, care must be exercised to prevent the stack from being too high as sufficient space must be left above the stack to permit the full number of covers that the spacing screws 50 can hold to be accepted onto the stack without jamming against the bottom of the spacing screws. The formation of a considerable stack is necessary as without it the covers from the spacing screws would have an undesirably long drop.

While a specific embodiment of a cover sterilizer has been disclosed herein, it is to be understood that various modifications of the above-mentioned structure may be made without departing from the spirit and scope of this invention as defined in the appended claims.

I claim:
1. Apparatus for feeding and sterilizing container covers comprising a housing, a plurality of spaced apart vertically extending screws in said housing for supporting covers in spaced relationship, means for rotating said screws for conveying the covers in the housing, means for distributing a sterilizing media in said housing whereby covers conveyed in spaced relationship by said screws are sterilized, means for introducing covers into said housing, means for feeding sterile covers out of said housing, first control means for preventing covers from being introduced to said plurality of screws, second control means for preventing covers from being fed out of said housing by said feeding means, means coupling said first and second control means for automatically actuating one of said control means upon the actuation of the other of said control means, and means for actuating at least one of said first and second control means.

2. Apparatus for feeding articles comprising a housing, means defining an entrance to said housing, means defining an exit from said housing, means for introducing articles into said housing through said entrance means, means for conveying articles from said entrance means to said exit means, first control means for preventing the introduction of articles into said housing in a first operative position thereof and permitting the introduction of articles into said housing in a second operative position thereof, second control means other than said conveying means for preventing the feeding of articles outwardly of said housing in a first operative position thereof and permitting the feeding of articles outwardly of said housing in a second operative position thereof, means coupling said first and second means for simultaneous movement thereof between said first and second positions, and means for moving at least one of said first and second means between the first and second positions thereof to selectively feed articles to and through said housing.

3. The apparatus for feeding articles as defined in claim 2 including means for distributing sterilizing fluid in said housing whereby articles conveyed through the housing by said conveying means are sterilized.

4. The apparatus for feeding articles as defined in claim 2 wherein said conveying means are a plurality of spaced apart vertically extending screws for spacing apart articles as the same are conveyed through said housing, and means for rotating said screws for conveying said articles through said housing in spaced relationship.

5. The apparatus for feeding articles as defined in claim 2 wherein said first and second control means each include a plurality of shiftable elements for contacting and supporting articles by the peripheries thereof when said first and second control means are in the first operative positions thereof.

6. The apparatus for feeding articles as defined in claim 2 wherein said entrance and exit means are spaced a predetermined distance from each other, the conveying means extend from said entrance means to a point remote from said exit means, and means are provided between said entrance means and said exit means for guiding articles toward said exit means after the latter leave said conveying means.

7. The apparatus for feeding articles as defined in claim 2 wherein said conveying means are a plurality of spaced apart vertically extending rotatable screws for spacing and conveying articles in a downward columnar fashion, a plurality of spaced apart feed screws in alignment with said rotatable spacing screws for feeding articles out of said housing through said exit means, and said second control means includes a plurality of elements shiftable into the space between the feed screws and the spacing screws for contacting the peripheries of the articles in the first operative position of the first and second control means to prevent the feeding of articles by the feed screws.

8. Apparatus for feeding container covers comprising a housing, means defining an entrance to said housing, means defining an exit from said housing, a plurality of spaced apart vertically extending rotatable screws in said housing for supporting a predetermined number of covers in spaced relationship, said screws being disposed adjacent said entrance means but terminating remote from said exit means, guide means between said rotatable screws and said exit means for guiding covers toward said exit means under the influence of gravity after the covers depart the rotatable screws and confining covers in stacked contacting relationship, a spaced between the rotatable screws and the stack of covers which is sufficient to accommodate the predetermined number of covers supported by the rotatable screws, first control means for preventing the introduction of covers into said housing in a first operative position thereof and permitting the introduction of covers into said housing in a second operative position thereof, second control means for preventing the feeding of covers outwardly of said housing in a first operative position thereof and permitting the feeding of articles outwardly of said housing in a second operative position thereof, and means for actuating said first and second control means to selectively feed covers to and through said housing.

9. The apparatus for feeding covers as defined in claim 8 wherein said actuating means includes means coupling said first and second control means for simultaneous movement thereof between said first and second positions.

10. A conveying and sterilizing apparatus comprising a first conveyor adapted to transport a plurality of filled cans toward a make-up point, detecting means located adjacent said first conveyor for determining the presence and absence of cans transported by said first conveyor, means for sterilizing container covers, said sterilizing means including a housing, means for introducing covers into said housing, means in said housing for spacing and conveying a plurality of container covers, said sterilizing means including fluid distributing means adjacent said spacing and conveying means for directing fluid toward covers being spaced and conveyed by said spacing and conveying means, feed means for feeding sterile covers out of said housing, first control means for preventing covers from being introduced to said spacing and conveying means, second control means for preventing covers from being fed out of said housing, coupling means between said first and second control means whereby actuation of one of said control means causes the actuation of the other of said control means, and one of said first and second control means being operatively connected to said detecting means so that indicated absence of a can by said detecting means prevents a cover from being fed from said housing and another cover from being introduced to said spacing and conveying means.

11. The conveying and sterilizing apparatus as defined in claim 10 wherein said spacing and conveying means is a plurality of spaced apart vertically extending rotatable screws; a plurality of rotatable spaced apart feed screws aligned for receiving covers from said spacing screws, and said second control means includes a plurality of elements shiftable into the space between the feeding and spacing screws.

References Cited
UNITED STATES PATENTS

| | | | |
|---|---|---|---|
| 1,450,356 | 4/1923 | Cramer | 113—114 |
| 1,857,075 | 5/1932 | Wright et al. | 53—71 |
| 1,895,184 | 1/1933 | Douglass et al. | 113—114 |
| 2,061,589 | 11/1936 | Philp | 113—114 |
| 2,484,830 | 10/1949 | Huntar | 113—114 |
| 2,549,216 | 4/1951 | Martin | 21—80 |
| 2,579,976 | 12/1951 | Simpson | 113—114 |
| 2,609,779 | 9/1952 | Goldsworthy | 221—222 X |
| 2,659,522 | 11/1953 | Ninneman et al. | 53—71 |
| 2,755,762 | 7/1956 | Glowen et al. | 113—114 |
| 2,755,763 | 7/1956 | Glowen et al. | 113—114 |
| 2,771,644 | 11/1956 | Martin | 21—78 |

JOSEPH SCOVRONEK, *Primary Examiner.*

MORRIS O. WOLK, *Examiner.*

J. T. ZATARGA, *Assistant Examiner.*